July 30, 1940.  T. R. SCOTT ET AL  2,209,894
METHOD OF AND MEANS FOR TERMINATING ELECTRIC CABLES
Filed Aug. 13, 1935  4 Sheets-Sheet 1

INVENTORS
T. R. SCOTT & J. K. WEBB
BY
R. C. Hopgood
ATTORNEY

July 30, 1940.   T. R. SCOTT ET AL   2,209,894
METHOD OF AND MEANS FOR TERMINATING ELECTRIC CABLES
Filed Aug. 13, 1935   4 Sheets-Sheet 3

INVENTORS
T. R. SCOTT & J. K. WEBB
BY
R. C. Hopgood
ATTORNEY

Patented July 30, 1940

2,209,894

UNITED STATES PATENT OFFICE 2,209,894

METHOD OF AND MEANS FOR TERMINATING ELECTRIC CABLES

Thomas Robertson Scott and John Krauss Webb, Aldwych, London, England, assignors to International Standard Electric Corporation, New York, N. Y.

Application August 13, 1935, Serial No. 35,960
In Great Britain January 1, 1935

6 Claims. (Cl. 174—20)

A considerable amount of trouble is experienced in connection with terminations of cables particularly on H. T. lines where the cables are impregnated with oil or like insulating compound. Much of this trouble has been due to difficulty in grading or easing off the electrical stress, but the condenser cone invention of the present applicants described in British Patent No. 377,311 has provided a simple remedy for this type of trouble. Another cause of trouble is however the physical/mechanical arrangement involved by present practice. The prevention of flashover in open air where humidity and atmospheric pollution (e. g. soot, salt etc.) are encountered necessitates the use of a large porcelain insulator. This must be provided with a metal cap and base, the latter being bolted to a bland which is in turn plumbed to the lead sheath of the cable. The metal parts are in general cemented to the porcelain and all joints have to be washered with oil-resisting material which in general is unsatisfactory. The sealing bell must moreover be filled or partially filled with insulating compound which covers the end of the cable.

This somewhat cumbersome arrangement has to withstand fairly severe temperature changes which are partly due to atmospheric variations of temperature and partly due to fluctuations of cable temperature due to variations of load current.

Since a number of widely different thermal coefficients of expansion are involved it is extremely difficult to maintain this arrangement free from leakage. Leakage involves loss of compound and/or ingress of air and moisture.

The compound in the bell is in direct contact with the compound in the cable and diffuses into the latter; any contamination of the bell compound by air or moisture therefore, eventually contaminates the cable compound with resultant tendency towards cable breakdown. The original filling of the bell in itself produces in general some such contamination since it is difficult in the field to produce a degree of dehydration, evacuation and degasification equal to that produced in the factory during the manufacture of the cable.

Finally since the cable has a direct outlet into the bell the heating of the cable tends to force oil into the bell. Cooling of the cable tends to withdraw oil from the bell into the cable. This accelerates mixing of the compounds and accelerates contamination. Distension of the lead sheath also tends to drain the bell by promoting slow flow down the cable.

The bell may also be inserted at the end of a cable which has been led down a gradient or from a pylon carrying an overhead line. In such cases there is a hydrostatic head of oil which tends to fill up the bell and produce internal hydrostatic pressures. For this reason, it is often necessary to leave a gas "cushion" in the bell to restrict the maximum pressure built up or alternatively to attach a "Sylphon" or reservoir system in which the gas cushion is separated from the oil by a diaphragm. The former method introduces gas within the end-bell and this gas goes into solution and eventually contaminates the cable. Both methods intrinsically keep the internal pressure of the bell at a fairly high level and accentuate the tendency to form leaks.

According to one feature of the present invention the pressure and contamination troubles in cable terminations indicated above are overcome by inserting a polymerised barrier or stop joint between the main cable and the end bell or other terminating device. Preferably this barrier is constituted by polymerised styrene.

A further feature of the invention, consists in the installation of a barrier at the base of the terminating device and the extension of the styrene insulation into the termination itself so that the cable is completely isolated from the oil filling in the terminating device. The invention also provides improved means for the utilisation of condenser stress cones in cable termination and for the termination of multi-core cables.

Generally stated, the invention consists in isolating the compound in the cable from that in the termination by means of a barrier of polymerised styrene or the like and the above and other features of the invention will be understood from the following description taken in conjunction with the accompanying drawings.

Figure 1:
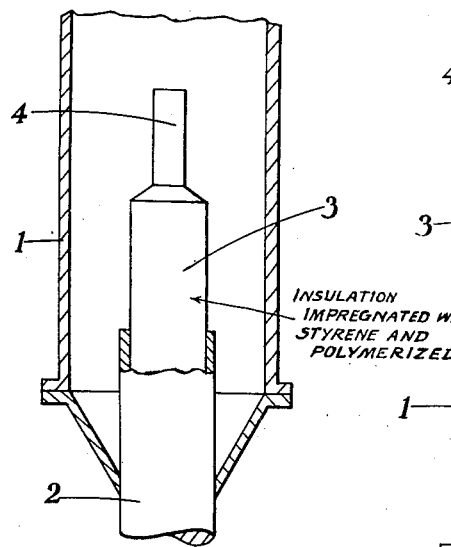
Fig. 1 is a diagram of the simplest form of cable termination according to this invention.
Figure 2:
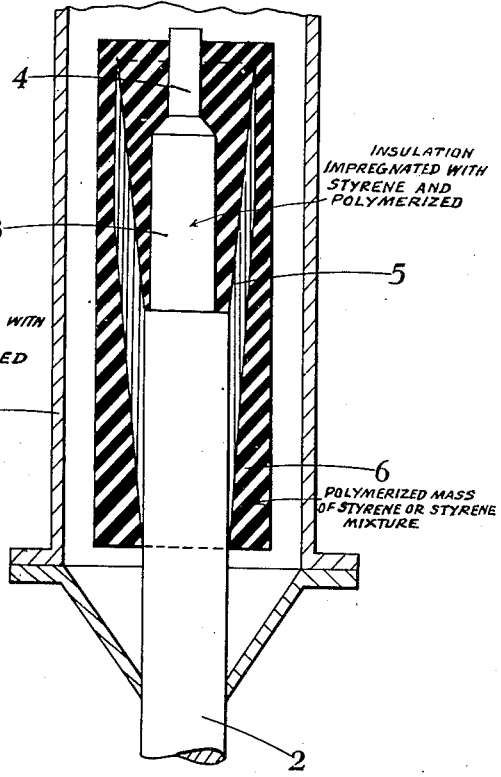
Fig. 2 is a diagram representing a cable termination according to the invention and using a condenser stress cone.

In Figs. 1 and 2 the cable is represented as terminating in a box 1 which may be a sealing bell, transformer gland, switchgear box or the like. The base of the box is suitably secured to the cable sheath 2 as by a wipe joint and in Fig. 1 the cable insulation 3 is impregnated with styrene and polymerised to form a solid plug of insulation extending into the lead sheath to form a complete barrier between the interior of the box and the remainder of the cable. The insulation may be impregnated and polymerised before removal of the lead sheath at the end of the cable and the projecting conductor 4 to which the terminal would be attached would be rendered solid by solder or other means if necessary to prevent communication therethrough. In Fig. 2 the end of the cable is provided with a condenser stress cone 5 which is encased together with the end of the cable in a polymerised mass 6. This is conveniently done by moulding in the factory, the cable 2 being a suitable length of tail cable which can be connected on site to the main cable. Instead of imbedding the core in a polmerised mass it may be provided in the factory with a surrounding jacket for example of paper impregnated with styrene which is polymerised to form a welded connection with the outer surface of the core.

Figure 3:
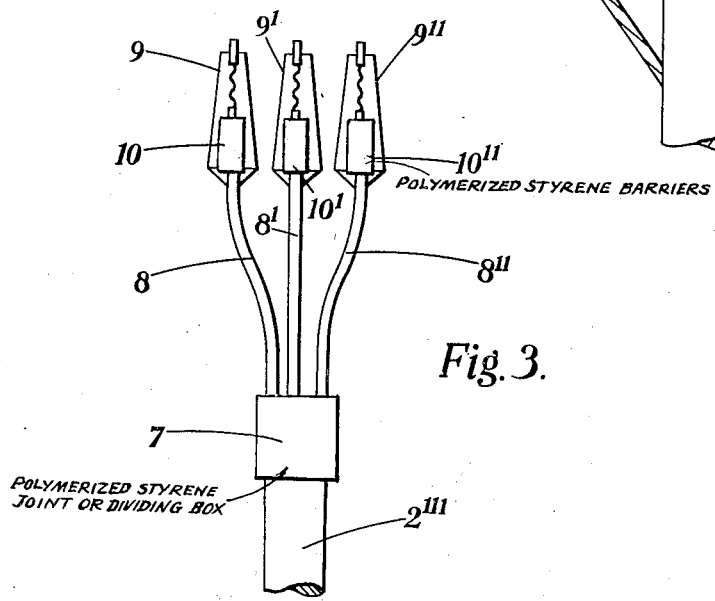
Fig. 3 is a diagram showing a method of applying the invention to multi-core cables.

Fig. 3 illustrates diagrammatically a method of terminating a three core cable $2^{111}$ in which 7 indicates a dividing box or joint in which the cores are separated. The joint may be a polymerised joint or it may be an oil joint. Tail cables 8, $8^1$ and $8^{11}$ connect with the terminations or sealing bells 9, $9^1$ and $9^{11}$ each of which is provided with a polymerised barrier as indicated by 10, $10^1$ and $10^{11}$.

Figure 4:
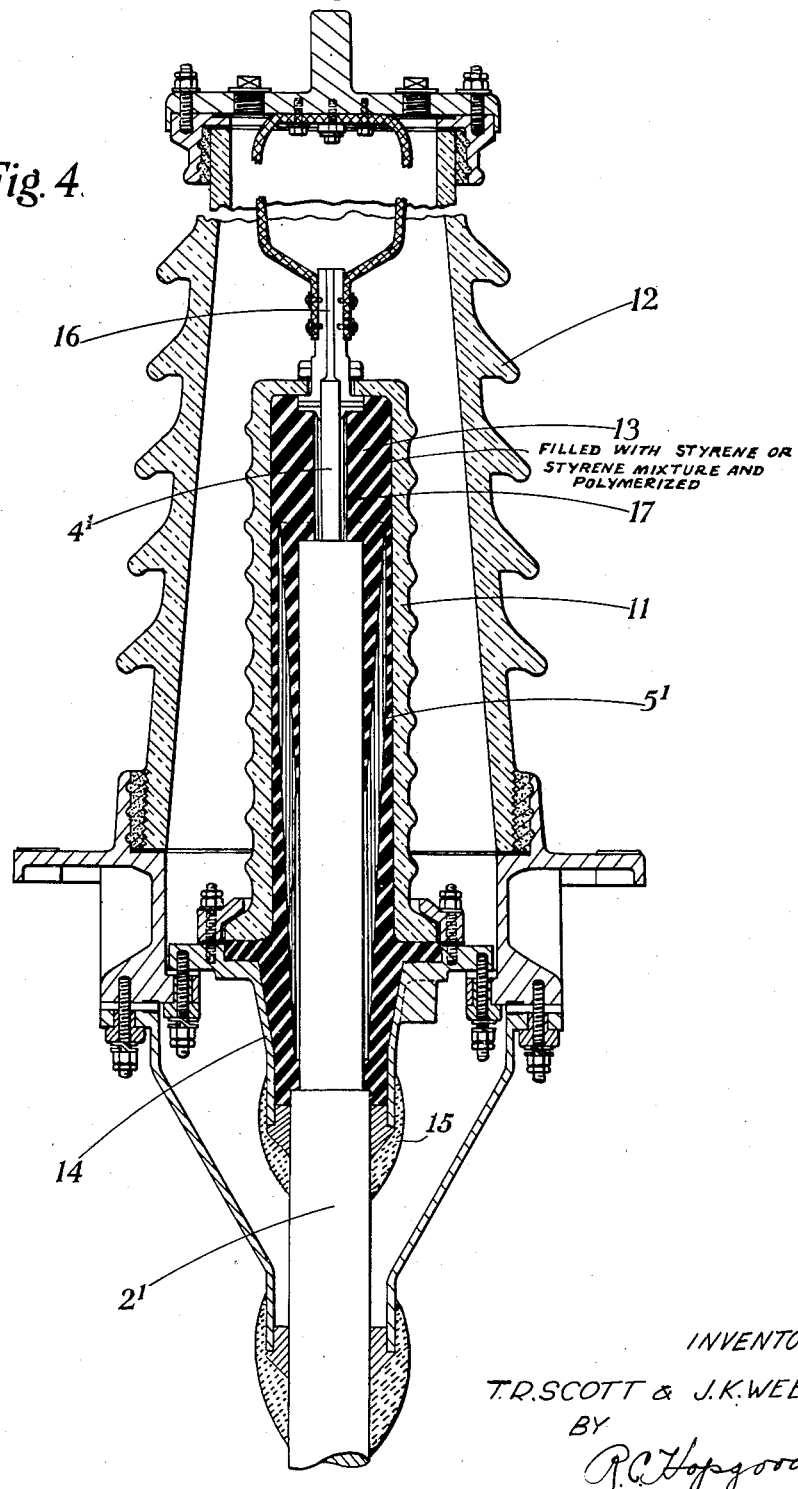
Fig. 4 shows a practical construction of cable termination embodying the invention.

Referring now to Fig. 4 it will be seen that the termination consists of a double insulator sealing bell, the cable end being housed in an inner porcelain bell 11 located in the outer porcelain insulator 12. A condenser cone $5^1$ is provided in the inner porcelain. Because of the grading effect of the condenser cone and because the exterior of the porcelain is under oil it is possible to withstand 33 kv. voltage on from 8" to 16" length of termination and 66 kv. voltage on from 16" to 25". If the inner porcelain is full of oil in contact with the cable oil the troubles mentioned above still exist i. e. the washered joints between porcelain and metal can still leak and cause contamination of the oil from air or moisture. Oil still flows into and out of the porcelain from and into the cable. Variations of hydraulic pressure still occur. If, however, the interior of the inner porcelain is filled with styrene which is polymerised into a solid form as indicated by the cross hatching at 13, the termination becomes a solid plug of high electrical quality free from all the physical/mechanical defects discussed above.

It is possible therefore to insert a "tail" cable into such a close fitting porcelain termination fitted with condenser cone (the cable being, say, 5 to 10 yards in length), to fill up the porcelain with liquid styrene and to polymerise the styrene in the termination in the factory. The termination with the tail cable after test is passed out for installation and is set up inside the porcelain end bell as shown in Fig. 4. The end bell is fitted with a suitable compound which is completely isolated from the cable insulation and which within reasonable limits can be contaminated with air and moisture without detriment to the termination and certainly without detriment to the cable insulation. The oil in the sealing bell can be run off for purification or replacement without exposing the cable.

The styrene termination so formed can be inserted, when required into a transformer or switchgear gland which can be filled with any suitable filling compound. The present tendency to block off transformer or switch oil from gland filling compound which is in turn in contact with the cable oil is totally eliminated. The tail cable of the styrene termination is jointed to the main cable at a convenient spot and the termination is complete.

In the construction shown in Fig. 4 the inner porcelain 11 is mounted on a base piece 14 which is secured to the cable sheath $2^1$ by a wipe joint 15 made in the factory. The cable end $4^1$ is connected to the terminal device 16 by an expansion connection 17 comprising a tubular piece into which the end of cable $4^1$ fits.

If a styrene joint is employed in the cable in conjunction with the above termination in which the tail cable is used is ordinary oil-impregnated cable, there will be two change overs from styrene impregnation to oil-impregnation. One of these occurs in the joint and is similar to the change-over at the other side of the joint, i. e. it is standard and efficient. The second, however, occurs at the termination within the cone and is the region of greatest weakness. The cone grades the stress longitudinally but there is sudden variation of radial stress where the cable emerges from the lead i. e. at the commencement of the junction of styrene and oil impregnation. It would be preferable to transfer this junction to another place and it is therefore proposed to insert the tail cable unimpregnated in the first instance, to impregnate the portion in the termination and into the lead sheath for a short distance with styrene and to impregnate the remainder of the cable with oil. This can be done by sheath impregnation methods. The junction is thus transferred to a region where the paper insulation is regularly applied by machine and the electrical stress is truly radial.

It would be still nearer an ideal arrangement if the whole of the tail cable were impregnated with styrene. This can be effected by assembling and drying out the termination and unimpregnated tail cable in the factory and installing on site the termination and making the joint between tail and main cables mechanically. Thereafter the joint, tail cable, and termination can be simultaneously evacuated and can be filled with liquid styrene. Polymerisation may then be carried out and a solid styrene insulation created from the joint right through to (and including) the termination. The only objection to this procedure is the fact that the main impregnation and polymerisation of the tail and termination is transferred from the factory to the field where the efficiency of the process is likely to be less due to weather and local conditions.

The ideal method is therefore to carry out the process in the factory but the objection arises that the styrene impregnated tail cable after polymerisation is inflexible and brittle. The inflexibility and brittleness can be reduced to some extent by the incorporation of plasticisers and by carrying out the polymerisation under conditions of temperature and time which result in a tough product rather than a brittle product. In general however rather more flexibility is required than can be obtained in this way.

It has been found however that it is possible to check the polymerisation so that the product consisting of a mixture of liquid styrene together with polystyrene is a plastic mass. This plastic mass will slowly become solid but the change will be so slow that it is possible to test and transfer to the field for installation, instal and joint, before the cable becomes inflexible. The polymerisation of the tail cable can then be continued to its final stage in conjunction with the joint. In this process it will be found more satisfactory to carry the polymerisation of the styrene in the termination to a higher degree than that of the tail cable. This can be effected by prolongation of local heating round the termination.

Fig. 4 shows a porcelain insulator employed as the casing for the termination. Since however no resistance to hydraulic pressure is required in this case (the resistance being provided by the solid polymerised styrene filling) it is possible to substitute mechanically weaker casings such as moulded phenol condensation products, etc., or since the polystyrene itself constitutes a solid impermeable termination it is possible to eliminate the casing entirely. The termination may therefore be primarily enclosed in a mould which is removed after polymerisation. The gland to which the porcelain is attached in Fig. 4 may therefore also be dispensed with and a cheaper design more economic in space realised. Such a construction is shown diagrammatically in Fig. 2.

If the outer porcelain (sealing bell) is constructed with internal corrugations to increase the surface flashover path it may be possible to eliminate the oil filling of the bell suggested above. In this case it may be necessary to increase the length of the styrene filled termination and to include corrugations on the casing or surface of this termination. The interior of the bell will be protected from contamination and moisture and will therefore be superior to the exterior in resistance to flashover.

The tail cable may be of greater copper cross section then the main cable to induce cooler running so that sealing bell temperatures are reduced and mechanical troubles due to thermal expansion are reduced. The tail may also be of increased insulation (radial) dimensions so that the electrical stress effects (radial) in the termination are reduced and the factor of safety of the termination correspondingly raised.

In cases in which the sealing bell is filled with oil or compound a second condenser cone may be inserted over the styrene filled termination to grade the longitudinal electric stress on this termination and to increase the grading effect in the interior surface of the outer porcelain.

In cases in which the condenser cone is used to give an auxiliary effect as a guard ring or as a tapped capacity for voltage indication or line protection the cone may be lightly insulated from the metallic sheath of the tail and the low potential connection of the cone brought out through the styrene filling for connection to the apparatus involved.

Figure 5:
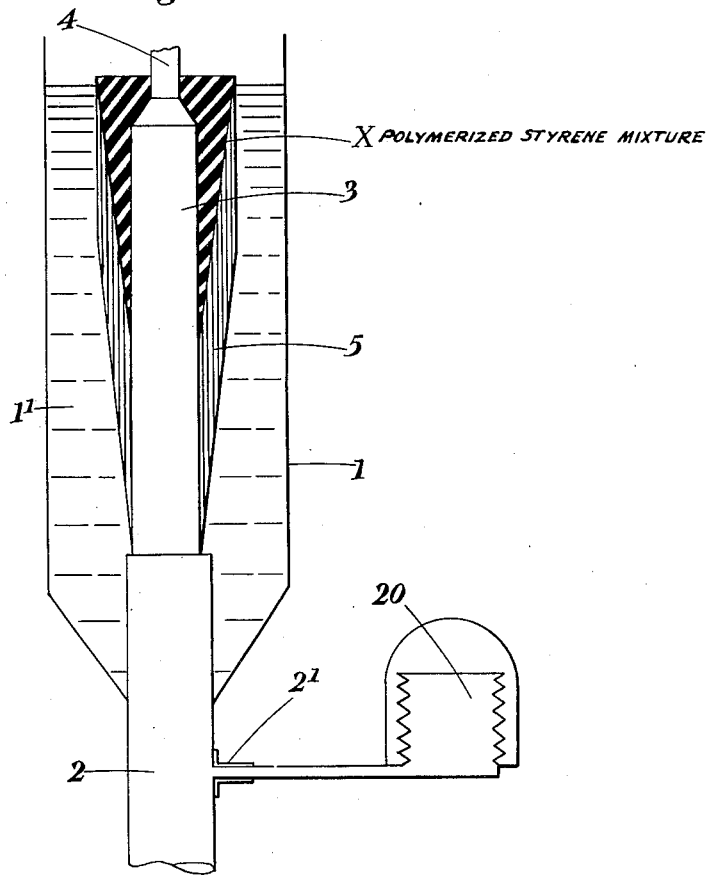
Fig. 5 is a diagram illustrating a further modification according to the invention.

In cases in which it is necessary or desirable to produce the above termination barrier effects in a main cable by methods applicable on site the following procedure may be adopted, reference being made to Fig. 5.

The strand 4 of the cable having been suitably blocked, as described above, the condenser cone 5 may be filled with styrene or a mixture of styrene and chlorinated diphenyl. This mixture penetrates the oil-impregnated insulation 3 of the portion of the cable within the cone. Sufficient time having been allowed for soaking in, the surplus mixture is roughly drained off and a prepolymerized mixture X (styrol-alcohol) prepared as described below may be poured in at a temperature which keeps the mixture fused (e. g. 138–140° C.). The fused mixture should preferably immerse the insulation of the cable within the cone as shown. During the filling process the cone is preferably immersed in hot oil the temperature being maintained in order to—

(a) Carry out polymerisation of styrene which has penetrated the cable—for this the temperature should be maintained at 120–130° C. for the requisite period.
(b) Permit gradual cooling of mixture poured into cone—during cooling the mixture may be rammed home by mechanical means and may be topped up as required.

It is assumed that the system is being used in an ordinary terminal box or bell 1 so that in service the condenser cone is immersed in oil or compound $1^1$. The arrangement then provides a plug or seal separating this oil or compound from the cable compound.

In cases in which it is desired to supply the cable with oil (e. g. in order to maintain a certain level of pressure in the cable) it may be necessary to add Sylphon arrangements. This can be done by tapping the lead sheath 2 and inserting a nipple $2^1$ which forms the connection to the Sylphon 20, the sheath being bulged out at the point of connection with the nipple to permit free flow of the oil.

The disadvantages mentioned above in that the cable within the termination is an oil/styrene junction are greatly diminished by the incorporation of alcohol or similar material in the poured filling mixture since a radial grading effect is obtained after the manner described below. A reasonable degree of efficiency will be obtained without incorporating the alcohol since the poured styrene on cooling presents a solid layer to the radial stress. If, however, very high values of stress are to be withstood the addition of grading materials is necessary. Similarly, it is possible to seal off or plug the cable simply by use of the poured material without inducing styrene into the cable and thereafter polymerising. In such a case however, the seal being plastic will not withstand high values of hydraulic pressure if these are induced in the cable.

The main component of the poured mixture is styrol polymerised at about 200° C. to obtain a polymer fusible at temperatures below 140° C. To the mixture plasticisers may be added. A material (which will not mix with oil) may also be added to increase the dielectric loss and/or the dielectric constant of the mixture. A suitable material is for example β phenol ethyl alcohol. It is generally known that electrical stress may be graded by juxtaposition of materials of varying dielectric constant. A similar effect may be obtained by increasing the dielectric loss of the ambient material.

Figure 7:
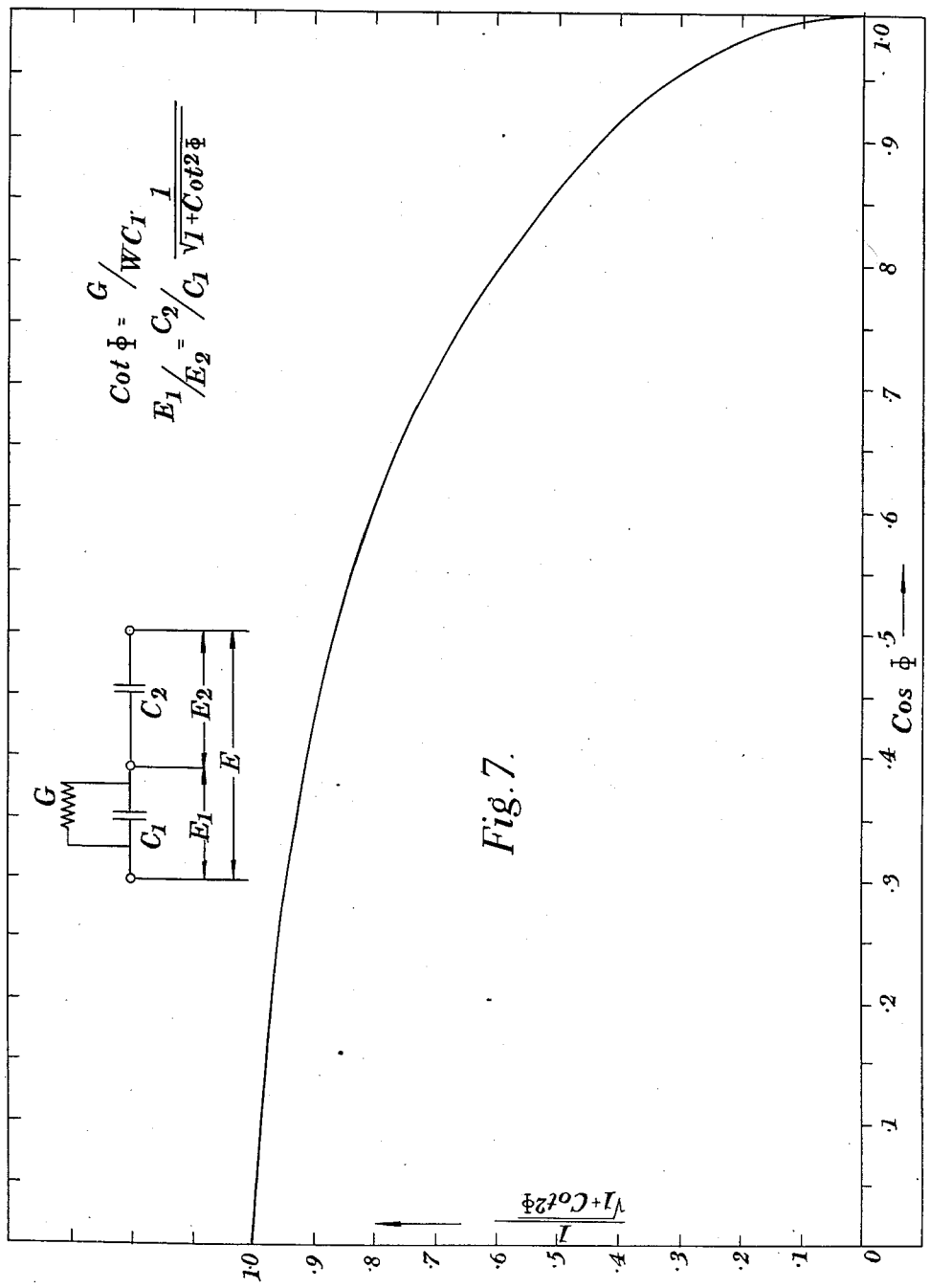
Fig. 7 is a curve showing the stress grading effect on the dielectric surrounding the core.

In Fig. 7 $C_2$ represents the capacity of the cable core (which is assumed to have very low dielectric loss—the normal case). The stress grading effect (radial) on the dielectric film surrounding the core (i. e. the poured mixture) is indicated for various values cos φ (the dielectric power factor of the poured mixture).

It is found that a mixture for pouring made up as follows:

Styrol 60 parts } polymerised @ 210° C.
Alcohol 40 parts gives a value of cos φ of .8 (at 30° C. and 50 cps.) and therefore, produces a value of $$0.59 \frac{C_2}{C_1}$$

The above special grading mixture may be employed in any of the "factory processes" on tail cables to obtain the grading effect.

In all poured mixtures or blocks of styrene polymerised in situ (e. g. of Fig. 2) a certain amount of "filler" e. g. cellulose fibres or esterified cellulose fibres may be used in order to reduce shrinkage due to contraction during cooling or polymerising.

Figure 6:
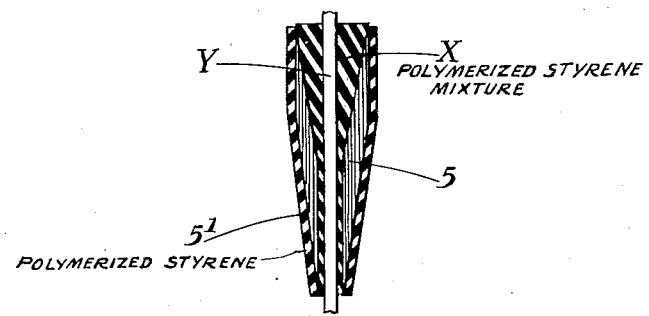
Fig. 6 is a detail diagram showing a method of applying a condenser cone to a cable end according to the invention.

Referring to Fig. 6 which shows a modified method of applying the cone, the following procedure may be adopted. The cone 5 with polymerized styrene jacket $5^1$ as described in connection with Fig. 2, may be filled in the factory with pourable mixture X as described. This cone may be heated on site until the mixture is in a plastic/fluid state and then applied over the cable core which may have been previously soaked in styrene/aroclar mixture. The cone when issued from the factory may have been supplied with a central metal rod or tube Y of diameter slightly less than that of the cable core, so that heating of the rod will render it easily removable as the cable core is threaded through the cone.

Although the description given above applies only to supertension terminations there are other equally interesting applications at lower voltages down to L. T. Considerable trouble is experienced in the cabling of buildings when vertical runs are encountered and these terminate in disconnecting boxes or switchgear. This effect is accentuated if the ambient temperature is high. Bleeding of the cable ensues and the viscous or semi-solid filling compound of the box or switchgear end-box is thinned by the inflow of hot cable compound. Box leakage therefore occurs. This would be eliminated by a termination-tail combination in accordance with this invention.

What is claimed is:

1. A method of terminating an insulated electric cable with a condenser cone which consists in filling the condenser cone with liquid polymerisable material, allowing the material to penetrate the insulation of the cable within the condenser cone and thereafter filling the condenser cone with a prepolymerised styrene mixture at a temperature sufficient to keep the mixture plastic, the material in the insulation of the cable being polymerised to form a barrier therein.

2. A method according to claim 1, wherein the prepolymerised styrene mixture comprises styrol and β phenyl ethyl alcohol.

3. A method according to claim 1 wherein the liquid polymerisable material is styrene.

4. A method according to claim 1, wherein the liquid polymerisable material is a mixture of styrene and chlorinated diphenyl.

5. A method according to claim 1 wherein the condenser cone is immersed in hot oil to effect polymerisation of the material which penetrates the cable insulation and to permit gradual cooling of the prepolymerised mixture subsequently poured into the cone.

6. The method of providing a barrier in an insulated electric cable which consists in filling a portion of the cable with liquid polymerizable material, allowing the material to penetrate the insulation of the cable and thereafter applying to that portion of the insulation a prepolymerized styrene mixture at a temperature sufficient to keep the mixture plastic, the material in the insulation of the cable being polymerized to form a barrier therein.

THOMAS ROBERTSON SCOTT.
JOHN KRAUSS WEBB.